(12) United States Patent
Kwak

(10) Patent No.: US 8,325,315 B2
(45) Date of Patent: Dec. 4, 2012

(54) MOTHER PANEL AND METHOD OF MANUFACTURING DISPLAY PANEL USING THE SAME

(75) Inventor: Sang-Ki Kwak, Chungcheongnam-do (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 683 days.

(21) Appl. No.: 12/543,116

(22) Filed: Aug. 18, 2009

(65) Prior Publication Data

US 2010/0045886 A1 Feb. 25, 2010

(30) Foreign Application Priority Data

Aug. 19, 2008 (KR) .............................. 2008-0080763
Aug. 12, 2009 (KR) .............................. 2009-0074392

(51) Int. Cl.
G02F 1/1333 (2006.01)
G02F 1/1337 (2006.01)
G02F 1/13 (2006.01)

(52) U.S. Cl. .......... 349/158; 349/40; 349/125; 349/130; 349/192

(58) Field of Classification Search ................. 349/158, 349/40, 125, 130, 190
See application file for complete search history.

(56) References Cited

U.S. PATENT DOCUMENTS

| 7,649,586 B2* | 1/2010 | Kim et al. ..................... 349/54 |
| 7,872,726 B2* | 1/2011 | Lu et al. ........................ 349/158 |
| 8,208,083 B2* | 6/2012 | Yoon et al. .................... 349/40 |
| 2011/0096449 A1* | 4/2011 | Lee et al. ..................... 361/91.1 |

* cited by examiner

*Primary Examiner* — Mike Qi
(74) *Attorney, Agent, or Firm* — F. Chau & Associates, LLC

(57) ABSTRACT

Electric power is applied to a static charge dissipating line to apply a pixel voltage to a pixel electrode. A common voltage is applied to a common electrode. The common voltage is applied to the common electrode through a shorting pad formed on the lower substrate, or a probe is contacted to the common electrode to apply the common voltage to the common electrode. A liquid crystal layer is exposed to light while an electric field is formed between the pixel electrode and the common electrode, so that a cured reactive mesogen (RM) layer is formed on a surface of an alignment layer to pretilt liquid crystal molecules. A manner of applying electric power to the pixel electrode or the common electrode is facilitated and the pixel voltage or the common voltage may be uniformly applied. Therefore, the quality of a display panel may be improved.

30 Claims, 12 Drawing Sheets

MOTHER PANEL AND METHOD OF MANUFACTURING DISPLAY PANEL USING THE SAME

CROSS-REFERENCE TO RELATED APPLICATION

This application claims priority under 35 U.S.C. §119 to Korean Patent Application No. 2008-80763, filed on Aug. 19, 2008, and Korean Patent Application No. 2009-74392, filed on Aug. 12, 2009 in the Korean Intellectual Property Office (KIPO), the contents of which are herein incorporated by reference in their entirety.

BACKGROUND OF THE INVENTION

1. Technical Field

Example embodiments of the present invention relate to a mother panel and a method of manufacturing a display panel using the mother panel. More particularly, example embodiments of the present invention relate to a vertical alignment mode mother panel, and a method of manufacturing a display panel, wherein liquid crystal molecules are aligned by an exposure process exposing the mother panel.

2. Discussion of the Related Art

In a conventional liquid crystal display (LCD) apparatus, in order to display an image, optical transmittance of liquid crystal molecules is controlled by an electric field. The LCD apparatus may be classified as a vertical electric field type and a horizontal electric field type according to the direction of an electric field for arranging the liquid crystal molecules.

The vertical electric field type LCD apparatus uses a vertical electric field generated between a pixel electrode and a common electrode facing each other to arrange the liquid crystal molecules in a vertical alignment (VA) mode. The LCD apparatus operated in the VA mode has a wide viewing angle of up to about 160 degrees.

The response time of liquid crystal molecules is the rearranging time of the liquid crystal molecules in response to an electric field applied to the LCD apparatus. In an LCD apparatus controlling liquid crystal molecules through a pixel electrode having micro-slits, the liquid crystal molecules are controlled by a fringe field formed by the micro-slits. There is a need to improve the response time of liquid crystal molecules adjacent to an alignment layer.

In order to improve the response time in the VA mode, a photosensitive curing agent or reactive mesogen (RM) is mixed with a liquid crystal layer and cured, so that the liquid crystal molecules adjacent to the alignment layer are pre-aligned in a horizontal direction.

In the above-mentioned photocuring process, an electric field is applied to the liquid crystal molecules to align the liquid crystal molecules in the horizontal direction while the liquid crystal molecules are exposed to light for curing the photosensitive curing agent. Accordingly, a plurality of signal lines for applying the electric field is disposed in a peripheral region of a display panel in a mother panel. A mother panel is a panel before being divided into a plurality of display panels. However, the conventional structure of the signal lines in the peripheral region may deteriorate processing efficiency.

SUMMARY OF THE INVENTION

Example embodiments of the present invention provide a mother panel capable of easily applying a signal.

Further, example embodiments of the present invention provide a method of manufacturing a display panel for facilitating the application of a signal to improve processing efficiency.

In accordance with an embodiment of the present invention, a mother panel includes a lower substrate, an upper substrate and a liquid crystal layer. The lower substrate includes a plurality of signal lines formed in a panel region, a pixel electrode connected to the signal lines in the panel region, and a static charge dissipating line formed in a peripheral region adjacent to the panel region, the static charge dissipating line receiving electric power and applying the electric power to the pixel electrode as a pixel voltage through the signal lines. The liquid crystal layer is interposed between the upper substrate and the lower substrate.

In an embodiment of the present invention, the lower substrate may further include a power supply pad extending from the static charge dissipating line. The electric power may be applied to the power supply pad, and the electric power applied to the power supply pad may be transmitted to the static charge dissipating line.

In embodiments of the present invention, the lower substrate may further include a shorting line formed in the peripheral region to electrically connect the signal lines, and a power transmission line connecting the static charge dissipating line to the shorting line. The lower substrate may further include a power supply pad extending from the static charge dissipating line and being formed in the peripheral region. The electric power may be applied to the power supply pad. The electric power applied to the power supply pad may be transmitted to the pixel electrode through the static charge dissipating line, the power transmission line, the shorting line and the signal lines.

In embodiments of the present invention, the lower substrate may further include a plurality of shorting diodes and a shorting diode. The shorting diodes are connected to the shorting line and the signal lines. The shorting diode outputs the electric power to a signal line when the electric power applied to the shorting line turns on the shorting diode. The lower substrate may further include a plurality of protection diodes connected to the shorting line and the signal lines. The protection diode outputs the signal to the shorting line, when a signal transmitted through the signal line turns on the protection diode. The signal line includes a gate line connected to a gate electrode of a thin-film transistor (TFT) and a data line connected to a source electrode of the TFT. The shorting line may include a gate shorting line and a data shorting line. The gate shorting line is connected to the power transmission line. The gate shorting line electrically shorts a plurality of gate lines. The data shorting line is connected to the power transmission line. The data shorting line electrically shorts a plurality of data lines.

In an embodiment of the present invention, the static charge dissipating line may surround the panel region and a portion of the peripheral region. The lower substrate may further include a power input terminal formed in the region surrounded by the static charge dissipating line. The power input terminal is electrically connected to the power transmission line and the shorting line.

In embodiments of the present invention, the lower substrate may further include a signal input pad formed in the peripheral region. The signal input pad is electrically connected to the signal lines. The signal input pad may be in contact with the static charge dissipating line, and the electric power applied to the static charge dissipating line may be applied to the signal lines through the signal input pad in contact with the static charge dissipating line. Alternatively, the lower substrate may further include a contact pad being in contact with both the signal input pad and the static charge dissipating line to electrically connect the signal input pad to the static charge dissipating line.

In an embodiment of the present invention, the lower substrate includes a plurality of panel regions and a plurality of static charge dissipating lines surrounding corresponding panel regions. The plurality of the static charge dissipating lines may be electrically connected to each other.

In embodiments of the present invention, the upper substrate may include a common electrode. The lower substrate may further include a shorting pad formed in the peripheral region. The shorting pad may be electrically connected to the common electrode to receive a common voltage. Alternatively, the common voltage is directly applied to the common electrode by an upper substrate power supply probe.

In embodiments of the present invention, the lower substrate may further include a first alignment layer formed on the pixel electrode, and a first cured reactive mesogen (RM) layer disposed on the first alignment layer. The lower substrate may further comprise a common electrode, a second alignment layer formed on the common electrode, and a second cured RM layer disposed on the second alignment layer. The first and second cured RM layers may be formed by irradiating light to the liquid crystal layer, which includes a plurality of liquid crystal molecules and an RM mixed with the liquid crystal molecules, to cure the RM, while the pixel voltage is applied to the pixel electrode and a common voltage is applied to the common electrode.

In accordance with another embodiment of the present invention, there is provided a method of manufacturing a display panel. In the method, a pixel voltage is applied to a pixel electrode through a plurality of signal lines by applying electric power to a static charge dissipating line formed in a peripheral region of a lower substrate. The plurality of signal lines is electrically connected to the static charge dissipating line. A common voltage is applied to a common electrode formed on an upper substrate. Light is irradiated to a liquid crystal layer which includes a plurality of liquid crystal molecules and an RM mixed with the liquid crystal molecules, to form a first cured RM layer and a second cured RM layer on the pixel electrode and the common electrode, respectively.

In an embodiment of the present invention, a first alignment layer may be formed on the pixel electrode. A second alignment layer may be formed on the common electrode. The first cured RM layer and the second cured RM layer may be formed on the first alignment layer and the second alignment layer, respectively.

In embodiments of the present invention, the pixel voltage may be applied to the pixel electrode by using a shorting diode. The shorting diode outputs the electric power to the signal line, when the electric power applied to the shorting line turns on the shorting diode. A protection diode may be connected to the signal line and the shorting line. The protection diode outputs the signal to the shorting line, when a signal transmitted through the signal line turns on the protection diode.

In embodiments of the present invention, the a mother panel including a plurality of panel regions and a plurality of static charge dissipating lines surrounding corresponding panel regions may be provided. The mother panel may be cut to form a plurality of display panels. Each of the display panels includes respective panel regions and respective peripheral regions but not including the static charge dissipating line. Electric power may be applied to a power input terminal formed in the peripheral region of the lower substrate. The power input terminal is electrically connected to the shorting line. A common voltage may be applied to the common electrode. Light is irradiated to the liquid crystal layer, to reform the first cured RM layer and the second cured RM layer anew on the pixel electrode and the common electrode, respectively. The plurality of the static charge dissipating lines may be electrically connected to each other to simultaneously receive the electric power.

In embodiments of the present invention, the electric power may be applied to a gate electrode of a TFT through a gate shorting line connected to the static charge dissipating line and a gate line connected to the gate shorting line. The TFT controls the pixel electrode. The electric power may be applied to a source electrode of the TFT through a data shorting line connected to the static charge dissipating line and a data line connected to the data shorting line.

In embodiments of the present invention, the common voltage may be applied through a shorting pad formed in the peripheral region of the lower substrate. The shorting pad is electrically connected to the common electrode.

In embodiments of the present invention, a portion of an edge of the upper substrate may be removed to expose the shorting pad and a power supply pad extending from the static charge dissipating line. A probe may be contacted to the shorting pad and the power supply pad to apply the pixel voltage to the lower substrate and the common voltage to the shorting pad, respectively.

In embodiments of the present invention, the lower substrate and the upper substrate are disposed so that a portion of an edge of the lower substrate and a portion of an edge of the upper substrate are exposed. A first probe is contacted to a power supply pad formed at the exposed portion of the edge of the lower substrate to apply the electric power to the static charge dissipating line. A second probe is contacted to the common electrode at the exposed portion of the edge of the upper substrate to apply the common voltage to the common electrode.

In embodiments of the present invention, the electric power applied to the static charge dissipating line may be transmitted to a signal input pad that is electrically connected to the signal lines and the static charge dissipating line, and the electric power applied to the signal input pad may be transmitted to the signal lines. The electric power applied to the static charge dissipating line may be transmitted to the signal input pad through a signal input pad that is in contact with the signal input pad.

According to embodiments of the present invention, a uniform pixel voltage may be applied to pixel electrodes, so that a pretilt direction of liquid crystal molecules may be more uniform by a cured RM layer. Further, additional lines separately connected to signal lines for applying signals to the pixel electrodes are not necessary on a mother panel, and thus the embodiments of the present invention are effective for a structure having a small interval between adjacent pixels. Still further, the application of a test voltage is simplified, so that a manufacturing time may be decreased.

BRIEF DESCRIPTION OF THE DRAWINGS

The embodiments of the present invention will become more apparent by describing in detailed example embodiments thereof with reference to the accompanying drawings.

DETAILED DESCRIPTION OF EMBODIMENTS OF THE INVENTION

Figure 1:
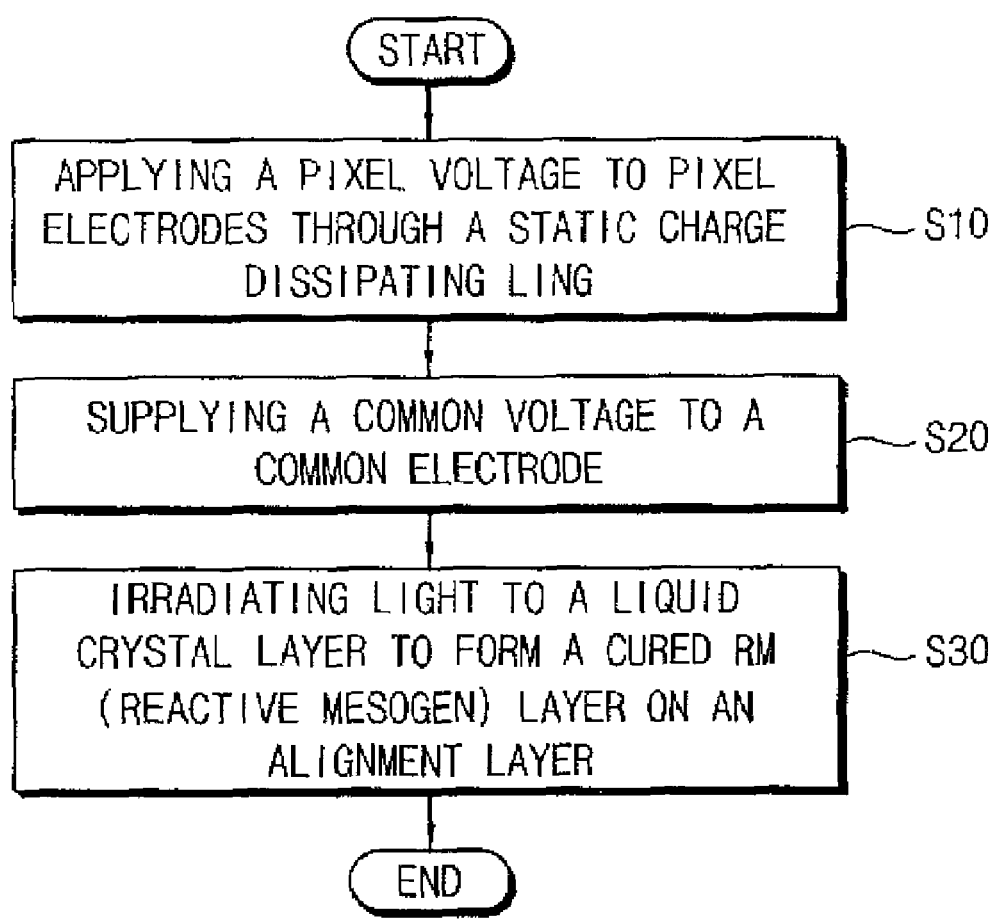
FIG. 1 is a flowchart of a method of manufacturing a display panel in accordance with an embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. Like numerals may refer to like elements throughout.

Figure 2:
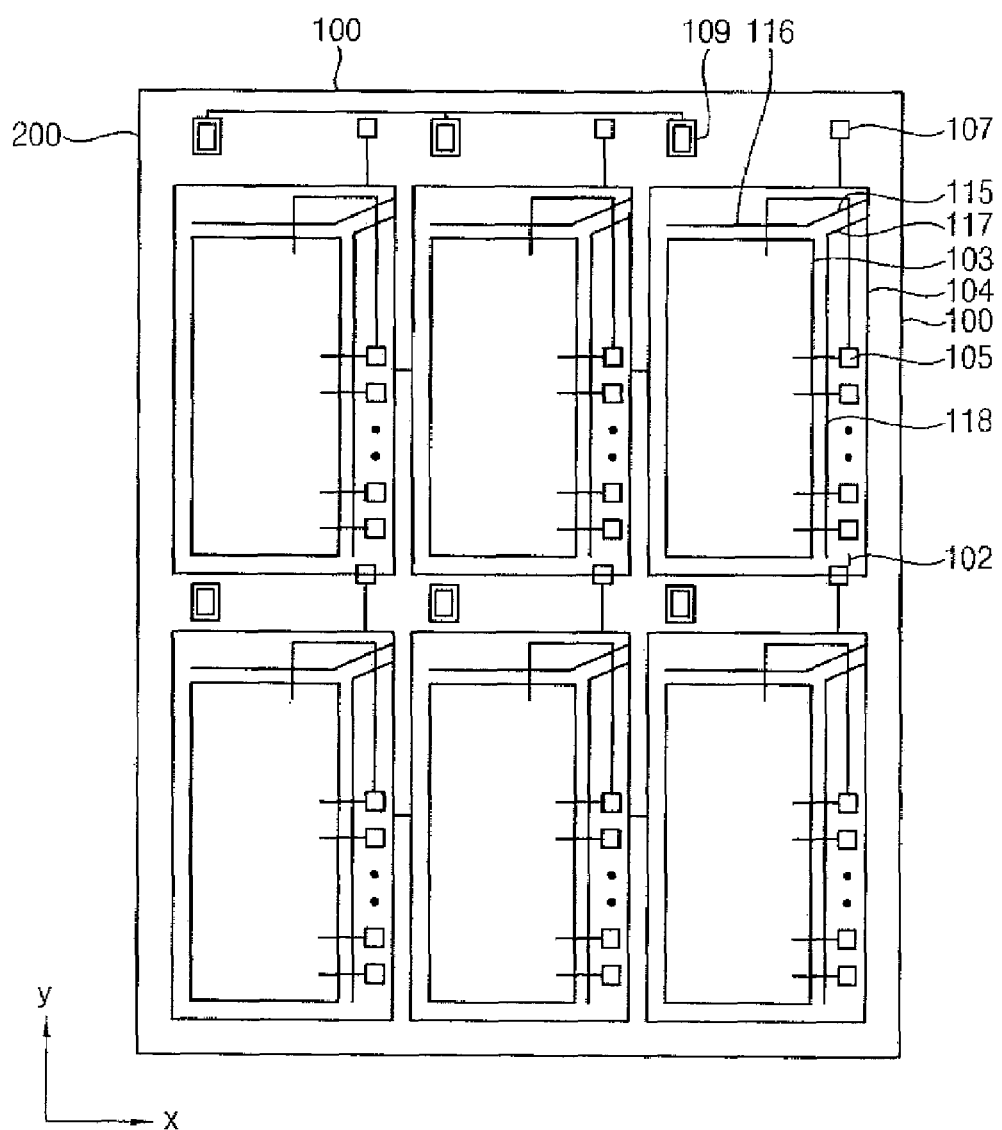
FIG. 2 is a plan view illustrating a mother panel in accordance with a first example embodiment of the present invention, on which a plurality of panel regions are defined, for manufacturing the display panel illustrated in FIG. 1.

FIG. 1 is a flowchart of a method of manufacturing a display panel in accordance with an embodiment of the present invention. FIG. 2 is a plan view illustrating a mother panel in accordance with a first example embodiment of the present invention, on which a plurality of panel regions are defined, for manufacturing the display panel illustrated in FIG. 1.

Referring to FIGS. 1 and 2, according to a method of manufacturing a display panel in accordance with an embodiment of the present invention, a pixel voltage is applied to a plurality of pixel electrodes by applying electric power to a static charge dissipating line 104 formed in a peripheral region 102 (step S10). The static charge dissipating line 104 is electrically connected to shorting lines 116 and 118. The pixel electrodes are connected in a panel region 103 to a plurality of signal lines electrically shorted by the shorting lines 116 and 118. Accordingly, when the electric power is applied to the static charge dissipating line 104, the electric power is transmitted to the shorting lines 116 and 118, and transmitted to the pixel electrodes through the plurality of signal lines electrically shorted by the shorting lines 116 and 118 to apply the pixel voltage to the pixel electrodes.

A mother panel 101 is used to manufacture a plurality of display panels. The mother panel 101 includes a lower substrate 100 on which a plurality of panel regions 103 is defined, an upper substrate 200 facing the lower substrate 100, and a liquid crystal layer interposed between the lower substrate 100 and the upper substrate 200.

The panel regions 103 are arranged in a matrix. The peripheral region 102 is defined as a region of the lower substrate 100 excluding the panel regions 103.

The pixel electrodes are formed in the panel region 103 of the lower substrate 100, and a common electrode facing the pixel electrodes is formed on the upper substrate 200.

After an exposure process for the liquid crystal layer, the lower substrate 100 and the upper substrate 200 are cut corresponding to the panel regions 103 to manufacture the display panels.

Figure 3:
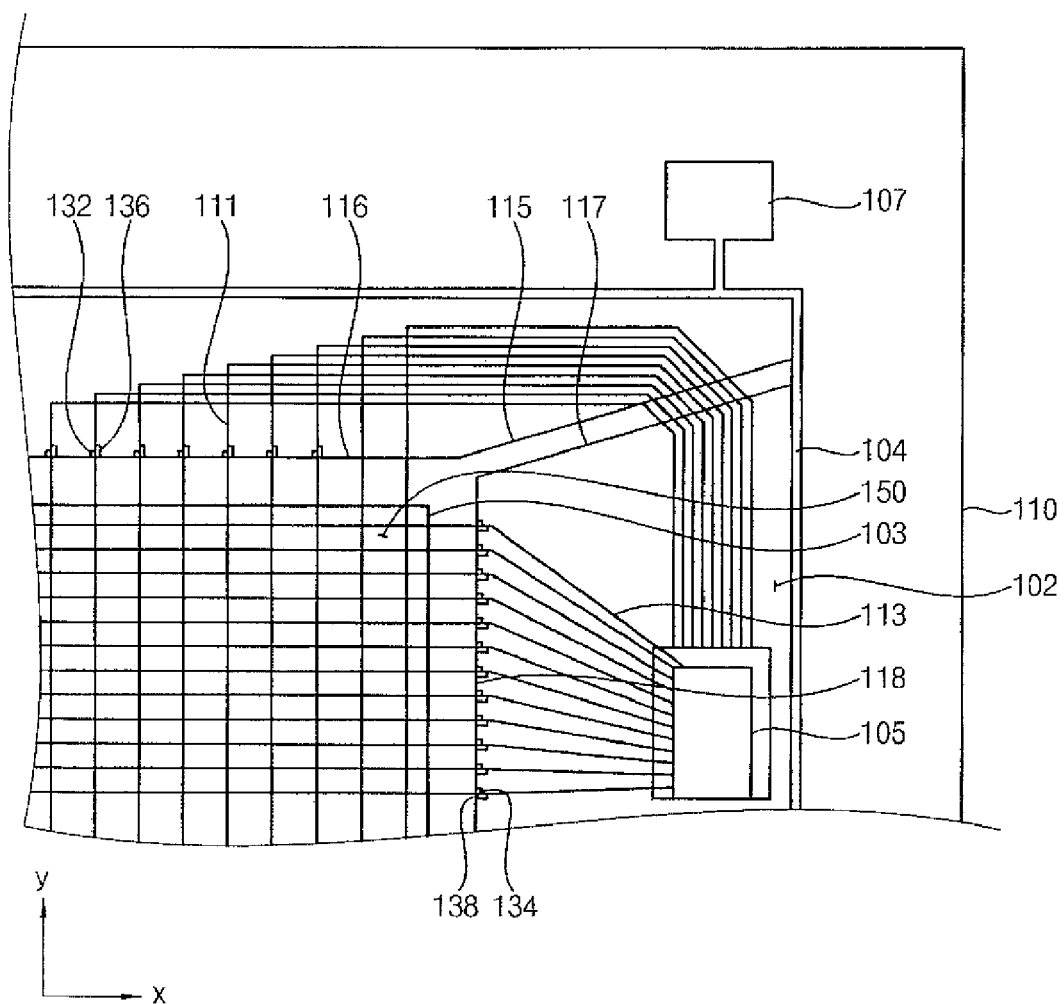
FIG. 3 is an enlarged plan view illustrating a portion of the lower substrate illustrated in FIG. 2.
Figure 4:
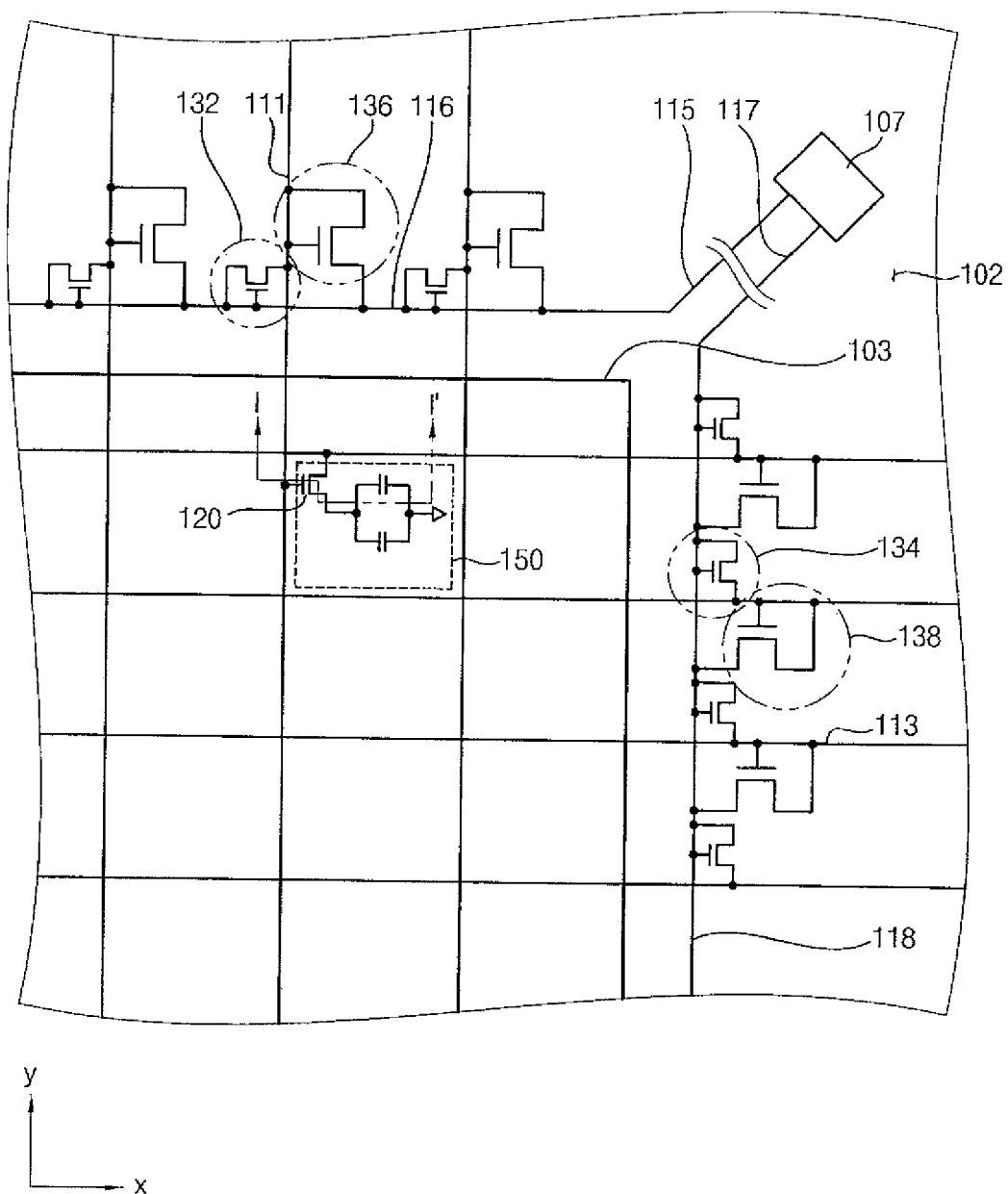
FIG. 4 is an equivalent circuit of elements formed on the lower substrate illustrated in FIG. 3.

FIG. 3 is an enlarged plan view illustrating a portion of the lower substrate illustrated in FIG. 2. FIG. 4 is an equivalent circuit of elements formed on the lower substrate illustrated in FIG. 3.

Referring to FIGS. 3 and 4, the lower substrate 100 includes a lower base substrate 110, a plurality of signal lines 111 and 113, the pixel electrode, the shorting lines 116 and 118, the static charge dissipating line 104 and power transmission lines 115 and 117. As shown in FIG. 3, a plurality of pixel regions 150 is defined in the panel region 103. A thin-film transistor (TFT) 120 is formed in each of the pixel regions 150.

The signal lines 111 and 113 include gate lines 111 and data lines 113.

The gate line 111 extends in a vertical direction (y), and is connected to a gate electrode of the TFT 120. The gate line 111 extends in the vertical direction (y) toward a peripheral region 102 adjacent to an upside of the panel region 103 (hereinafter, "upper peripheral region"). The gate line 111 may further extend in a horizontal direction (x) from the upper peripheral region toward a peripheral region 102 adjacent to a right side of the panel region 103 (hereinafter, "right-side peripheral region"). A signal input pad 105 may be formed in the right-side peripheral region, and the gate line 111 may be electrically connected to the signal input pad 105.

The data lines 113 are insulated from the gate lines 111. The data line 113 extends in a horizontal direction (x), and is connected to a source electrode of the TFT 120. The data line 113 may extend to the right-side peripheral region and be electrically connected to the signal input pad 105.

Figure 5A:
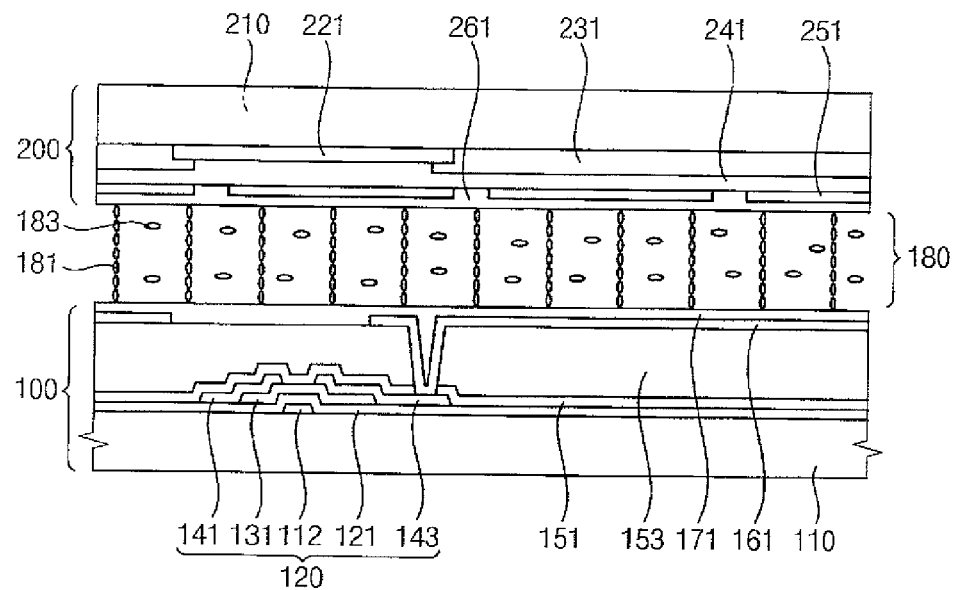
FIG. 5A is a cross-sectional view in accordance with an embodiment of the mother panel taken along a line I-I' in FIG. 4.

FIG. 5A is a cross-sectional view in accordance with an embodiment of a panel region of the mother panel taken along a line I-I' in FIG. 4.

Referring to FIGS. 4 and 5A, the TFT 120 may further include a gate insulation layer 121 and a semiconductor pattern 131. The gate insulation layer 121 is formed on the lower base substrate 110 on which the gate line 111 is formed. The semiconductor pattern 131 is formed on the gate insulation layer 121, corresponding to a gate electrode 112. A source electrode 141 and a drain electrode 143 are formed on the semiconductor pattern 131 to face each other with respect to the gate electrode 112.

The lower substrate 100 may further include a passivation layer 151, an organic insulation layer 153 and a first alignment layer 171.

The passivation layer 151 is formed on the TFT 120. The organic insulation layer 153 is formed on the passivation layer 151.

A pixel electrode 161 is formed on the organic insulation layer 153 in the pixel region 150. The first alignment layer 171 is formed on the pixel electrode 161.

The upper substrate 200 may include an upper base substrate 210, a light-blocking pattern 221 blocking the TFT 120 and the signal lines, a color filter 231 facing the pixel electrode 161, an overcoat layer 241 covering the color filter 231, a common electrode 251 formed on the overcoat layer 241, and a second alignment layer 261 formed on the common electrode 251.

A liquid crystal layer 180 is interposed between the first alignment layer 171 and the second alignment layer 261. The liquid crystal layer 180 includes liquid crystal molecules 181 and a reactive mesogen (1M) 183 mixed with the liquid crystal molecules 181. As shown in FIG. 5A, the liquid crystal molecules are aligned so that the major axis of the liquid crystal molecules hereinafter, "directional indicator") is perpendicular to the lower substrate 100 and the upper substrate 200, when no electric field is generated between the pixel electrode 161 and the common electrode 251. The RM 183 is a photosensitive compound, and may be cured by light such as ultraviolet rays to form a cured RM layer on the first alignment layer 171 and on the second alignment layer 261.

According to an embodiment, in order to increase the viewing angle of the display panel, the pixel region 150 may be divided into a plurality of domains in which alignment directions of the liquid crystal molecules 181 are different from each other.

In order to divide the pixel region 150 into the plurality of domains, a plurality of micro-slits may be formed to extend in different directions according to the domains. For example, the directional indicators of the liquid crystal molecules 181 are aligned in the extending direction of the micro-slits to form the plurality of domains for improving the viewing angle. The liquid crystal layer 180 may be operated in a patterned vertical alignment (PVA) mode, wherein a slit pattern may be formed on the pixel electrode 161 and the common electrode 251. Alternatively, a slit pattern may be formed on one of the pixel electrode 161 or the common electrode 251. In an alternative embodiment, slit patterns may be replaced by protrusions formed on the pixel electrode 161 and/or the common electrode 251.

Figure 5B:
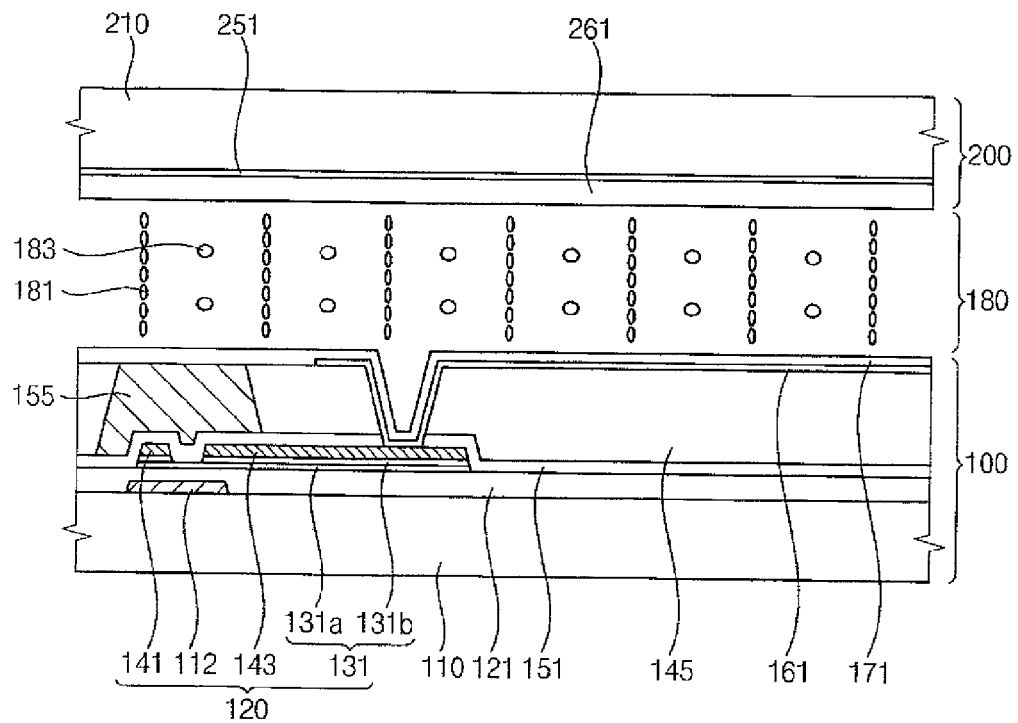
FIG. 5B is a cross-sectional view in accordance with another embodiment of the mother panel taken along a line I-I' in FIG. 4.

FIG. 5B is a cross-sectional view in accordance with another embodiment of a panel region of the mother panel taken along a line I-I' in FIG. 4.

The display panel described with reference to FIG. 5B may be substantially the same as the display panel described with reference to FIG. 5A except that a light-blocking pattern and a color filter are formed on the lower substrate 100. Therefore, the same reference numbers are used for the same or similar elements, and any further descriptions concerning the same or similar elements are omitted.

Referring to FIGS. 4 and 5B, the TFT 120 may include a gate electrode 112 connected to the gate line 111, a gate insulation layer 121 formed on the gate electrode 112, a source electrode 141 connected to the data line 113, a drain electrode 143 separated from the source electrode 141, and a semiconductor pattern 131 formed on the gate insulation layer 121. The semiconductor pattern 131 may include a semiconductor layer 131a and an ohmic-contact layer 131b.

The lower substrate 100 may further include a passivation layer 151 on the TFT 120.

The lower substrate 100 may her include a color filter 145 on the passivation layer 151. The color filter 231 described in FIG. 5A is formed on the upper substrate 200, but the color filter 145 described in FIG. 5B is formed on the lower substrate 100.

The lower substrate 100 may further include a light-blocking pattern 155 formed on the passivation layer 151. The light-blocking pattern 155 blocks at least a portion of the TFT 120. The light-blocking pattern 221 described in FIG. 5A is formed on the upper substrate 200, but the light-blocking pattern 155 described in FIG. 5B is formed on the lower substrate 100.

A pixel electrode 161 is formed on the color filter 145, and a first alignment layer 171 is formed on the pixel electrode 161.

The upper substrate 200 may include an upper base substrate 210, a common electrode 251 facing the pixel electrode 161, and a second alignment layer 261 formed on the common electrode 251.

A liquid crystal layer 180 is interposed between the first alignment layer 171 and the second alignment layer 261. The liquid crystal layer 180 includes liquid crystal molecules 181 and a reactive mesogen (RM) 183 mixed with the liquid crystal molecules 181. The liquid crystal molecules may be aligned so that the directional indicator is perpendicular to the lower substrate 100 and the upper substrate 200, when no electric field is generated between the pixel electrode 161 and the common electrode 251. The RM 183 is a photosensitive compound, and may be cured by light such as ultraviolet rays to form a cured RM layer on the first alignment layer 171 and on the second alignment layer 261.

In order to increase the viewing angle of the display panel, the pixel region 150 may be divided into a plurality of domains in which alignment directions of the liquid crystal molecules 181 are different from each other. The divided domains has already explained, and thus further explanation will be omitted.

Referring back to FIGS. 2 and 3, the shorting lines 116 and 118 may include a gate shorting line 116 and a data shorting line 118. The gate shorting line 116 and the data shorting line 118 prevent accidental static electricity or other electric shocks from being transmitted to the gate line 111 and the data line 113 and the consequent breaking down of the TFT 120 and the pixel electrode 161.

Referring back to FIG. 4, the data shorting line 118 extends in the vertical direction (y) in the right side peripheral region.

The lower substrate 100 may further include shorting diodes and protection diodes. The shorting diodes include gate shorting diodes 132 and data shorting diodes 134. The protection diodes include gate protection diodes 136 and data protection diodes 138.

The data line 113 is electrically connected to the data shorting line 118 through the data shorting diode 134. More specifically, the data line 113 is connected in parallel to the data shorting line 118 through the data shorting diode 134.

The data shorting diode 134 includes a control electrode, an input electrode and an output electrode. The control electrode and the input electrode are connected to the data shorting line 118. The output electrode is connected to the data line 113. When a test voltage is applied to the data shorting line 118, the test voltage is simultaneously applied to the control electrode and the input electrode of the data shorting diode 134. Accordingly, the control electrode of the data shorting diode 134 is turned on, so that the test voltage is output from the input electrode to the output electrode of the data shorting diode 134.

The test voltage applied to the output electrode of the data shorting diode 134 may be applied to the source electrode 141 of the TFT 120 through the data line 113. Since the test voltage applied to the data shorting line 118 is simultaneously applied to the data shorting diode 134 connected to the data line 113, the same test voltage may be simultaneously applied to the plurality of data lines 113.

The data protection diode 138 includes a control electrode, an input electrode and an output electrode. The control electrode and the input electrode of the data protection diode 138 are connected to the data line 113. The output electrode is connected to the data shorting line 118. When a disturbing signal such as static electricity, electric shock, etc. is input to the data line 113, the disturbing signal is simultaneously applied to the control electrode and the input electrode of the data protection diode 138. Accordingly, the control electrode of the data protection diode 138 is turned on by the disturbing signal, so that the disturbing signal is applied to the data shorting line 118 through the output electrode of the data protection diode 138.

The disturbing signal applied to the data shorting line 118 is applied to the control electrode and the input electrode of the data shorting diode 134. When the control electrode of the data shorting diode 134 is turned on by the disturbing signal, the disturbing signal is output to the data line 113. Accordingly, the disturbing signal is applied to the plurality of data lines 113 by the data shorting line 118, so that the source electrode 141 of the TFT 120 may be protected from being overloaded.

The gate line 111 is electrically connected to the gate shorting line 116 through the gate shorting diode 132. More specifically, the gate line 111 is connected in parallel to the gate shorting line 116 through the gate shorting diode 132.

The gate shorting diode 132 includes a control electrode, an input electrode and an output electrode. The control electrode and the input electrode are connected to the gate shorting line 116. The output electrode is connected to the gate line 111. When a test voltage is applied to the gate shorting line 116, the test voltage is simultaneously applied to the control electrode and the input electrode of the gate shorting diode 132. Accordingly, the control electrode of the gate shorting diode 132 is turned on, so that the test voltage is output from the input electrode to the output electrode of the gate shorting diode 132.

The test voltage applied to the output electrode of the gate shorting diode 132 may be applied to the gate electrode 112 of the TFT 120 through the gate line 111. Since the test voltage applied to the gate shorting line 116 is simultaneously applied to the gate shorting diode 132 connected to the gate line 111, the same test voltage may be simultaneously applied to the plurality of gate lines 111.

The gate protection diode 136 includes a control electrode, an input electrode and an output electrode. The control electrode and the input electrode of the gate protection diode 136 are connected to the gate line 111. The output electrode is connected to the gate shorting line 116. When a disturbing signal such as static electricity, electric shock, etc. is input to the gate line 111, the disturbing signal is simultaneously applied to the control electrode and the input electrode of the gate protection diode 136. Accordingly, the control electrode of the gate protection diode 136 is turned on by the disturbing signal, so that the disturbing signal is applied to the gate shorting line 116 through the output electrode of the gate protection diode 136. The disturbing signal applied to the gate shorting line 116 is applied to the control electrode and the input electrode of the gate shorting diode 132. When the control electrode of the gate shorting diode 132 is turned on by the disturbing signal, the disturbing signal is output to the gate line 111.

Accordingly, the disturbing signal is applied to the plurality of gate lines 111 by the gate shorting line 116, so that the gate electrode 112 of the TFT 120 may be protected from being overloaded.

Referring back to FIGS. 2 and 3, the static charge dissipating line 104 is formed to surround the gate line 111, the data line 113 and the signal input pad 105. Further, a plurality of the static charge dissipating lines 104 is electrically connected to each other. Since static electricity generated in the mother panel 101 may be transmitted through the static charge dissipating line 104, the mother panel 101 may be protected from the static electricity.

The power transmission lines may include a first connection line 115 and a second connection line 117. The first connection line 115 electrically connects the gate shorting line 116 to the static charge dissipating line 104. The second connection line 117 electrically connects the data shorting line 118 to the static charge dissipating line 104.

Accordingly, the static charge dissipating line 104, the first connection line 115, the second connection line 117, the gate shorting line 116 and the data shorting line 118 are electrically connected. Therefore, when electric power is applied to a power supply pad 107 extending from the static charge dissipating line 104, a voltage is simultaneously applied to the gate electrode 112 and the source electrode 141 of the TFT through the gate shorting line 116, the gate shorting diode 132, the data shorting line 118 and the data shorting diode 134, so that a pixel voltage is charged in the pixel electrode 161.

For example, when a voltage of about 30 volts is applied to the static charge dissipating line 104, a pixel voltage of about 10 volts may be charged in the pixel electrode 161.

Figure 6:
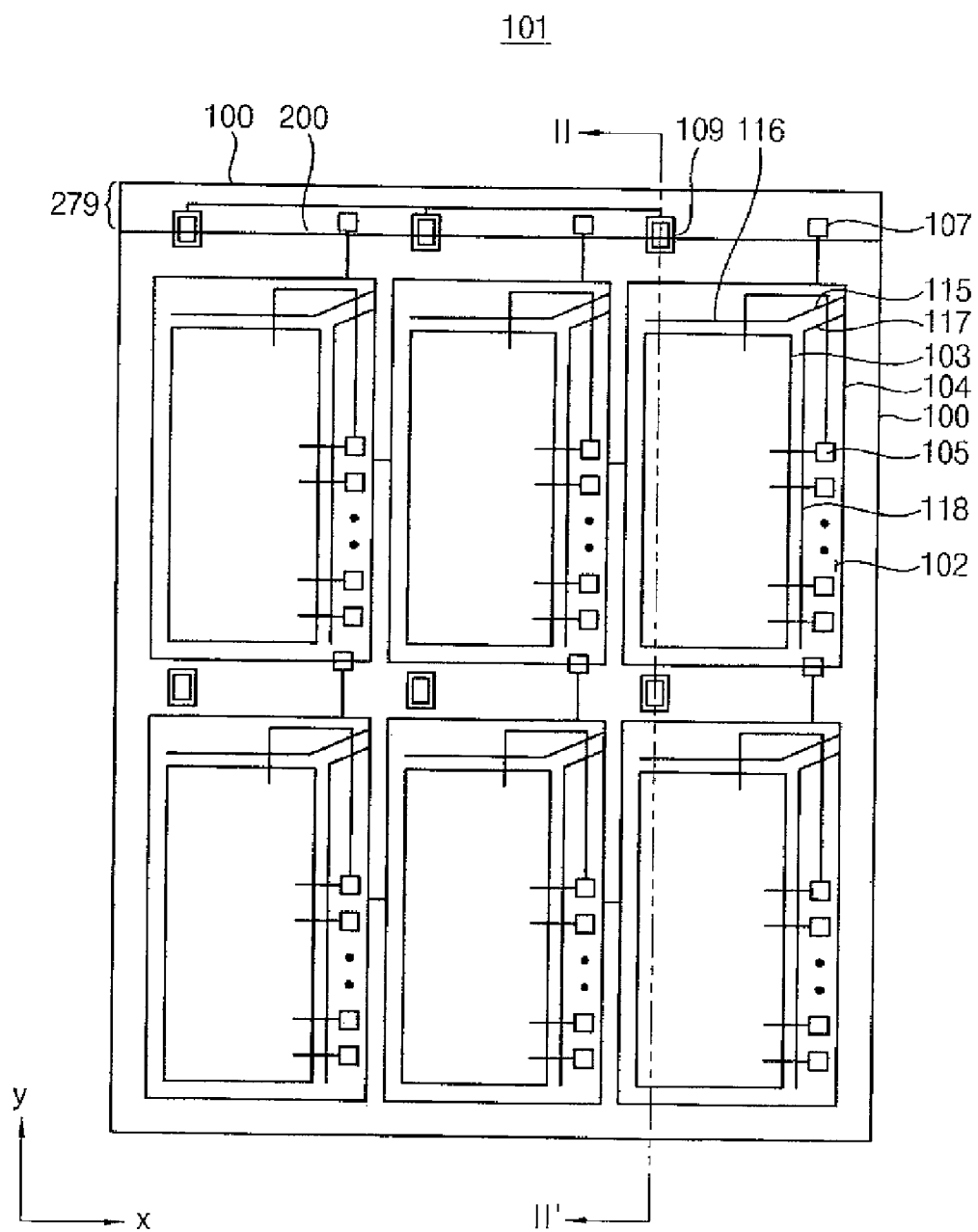
FIG. 6 is a plan view of a mother panel of the mother panel illustrated in FIG. 2, in which a portion of an edge of an upper substrate is removed in accordance with an embodiment of the present invention.

FIG. 6 is a plan view of a mother panel of the mother panel illustrated in FIG. 2, in which a portion of an edge of an upper substrate is removed in accordance with an embodiment of the present invention.

Referring to FIG. 6, an upper edge of the upper substrate 200 may be cut along the horizontal direction (x), in order to apply the pixel voltage to the lower substrate 100. For example, a laser beam may be used to cut the upper edge of the upper substrate 200. Accordingly, an edge 279 of the lower substrate 100 corresponding to the removed upper edge of the upper substrate 200 is exposed. A portion of the power supply pad 107 extending from the static charge dissipating line 104 is exposed at the edge 279 of the lower substrate 100. In order to apply the pixel voltage to the lower substrate 100, the power supply pad 107 contacts a probe for applying electric power.

Figure 7:
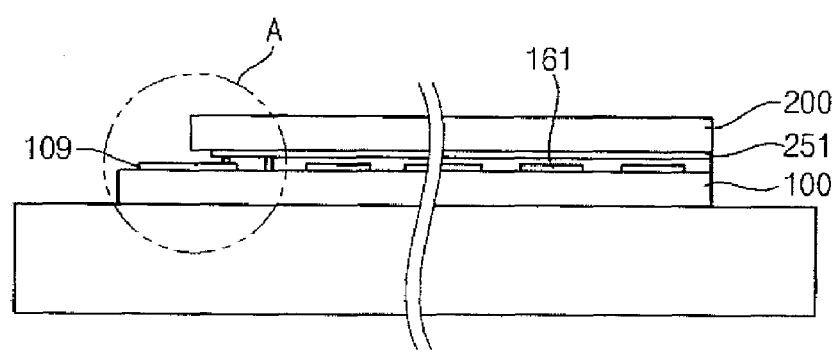
FIG. 7 is a cross-sectional view of the mother panel taken along a line II-II' in FIG. 6.
Figure 8:
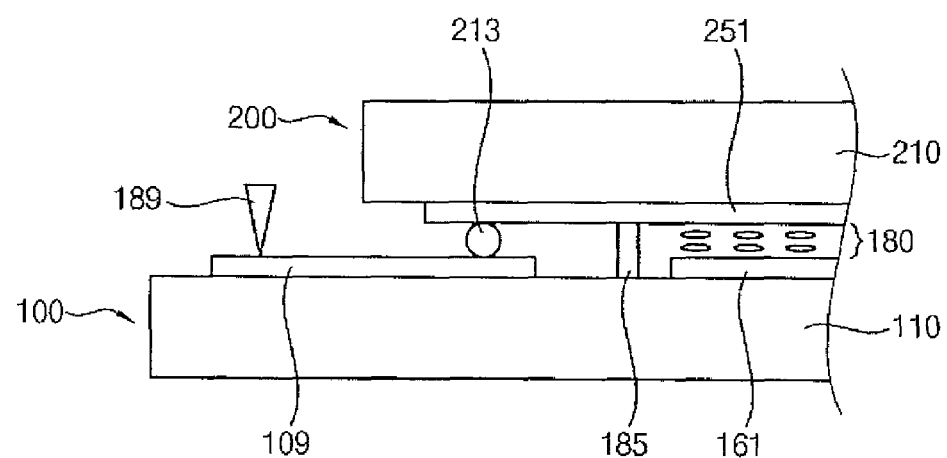
FIG. 8 is an enlarged cross-sectional view illustrating an area "A" illustrated in FIG. 7.

FIG. 7 is a cross-sectional view of the mother panel taken along a line II-II' in FIG. 6. FIG. 8 is an enlarged cross-sectional view illustrating an area "A" illustrated in FIG. 7.

Referring to FIGS. 7 and 8, in order to manufacture a display panel in accordance with an embodiment of the present invention, a common voltage is applied to the common electrode 251 (step S20 in FIG. 1). The common voltage may be applied to the common electrode 251 after the pixel voltage is applied to the pixel electrode 161. Alternatively, the common voltage may be applied to the common electrode 251 before the pixel voltage is applied to the pixel electrode 161, or the common voltage and the pixel voltage may be simultaneously applied.

As shown in FIGS. 2 and 6, a plurality of shorting pads 109 are further formed in the peripheral region 102 of the lower substrate 100. The liquid crystal layer 180 is sealed by a sealing member 185 formed between the upper substrate 200 and the lower substrate 100. Referring to FIG. 6, portions of the shorting pads 109 are exposed to an outside of the upper substrate 200 whose upper edge 249 is cut. The shorting pad 109 is electrically connected to the common electrode 251 extending to an outside of the sealing member 185 through a shorting member 213.

A probe 189 may be contacted to the shorting pad 109 to apply the common voltage to the shorting pad 109. Accordingly, the pixel voltage is applied to the pixel electrode 161 and the common voltage is applied to the common electrode 251, so that an electric field may be applied to the liquid crystal layer 180.

Figure 9:
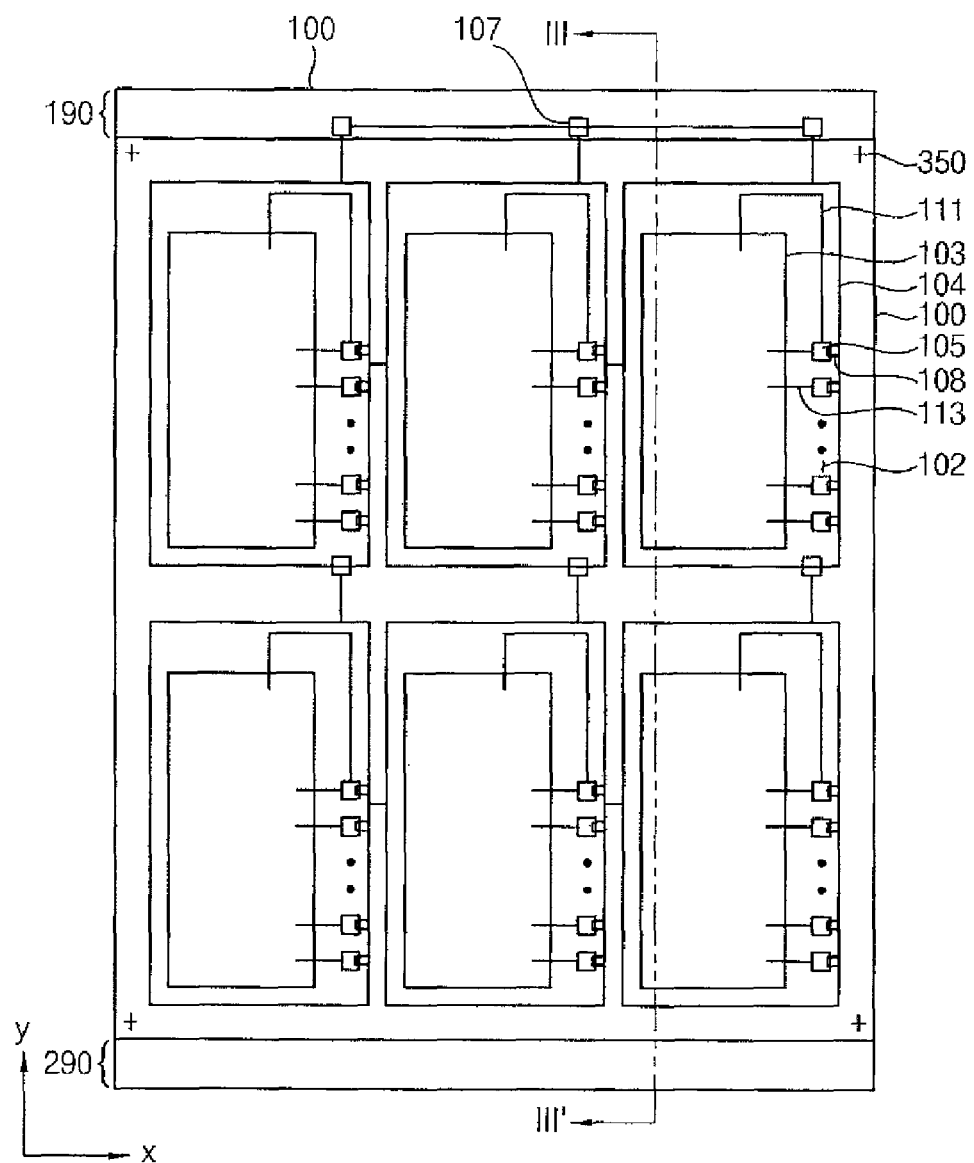
FIG. 9 is a plan view illustrating a mother panel in accordance with a second example embodiment of the present invention, on which a plurality of panel regions are defined, for manufacturing the display panel illustrated in FIG. 1.
Figure 10:
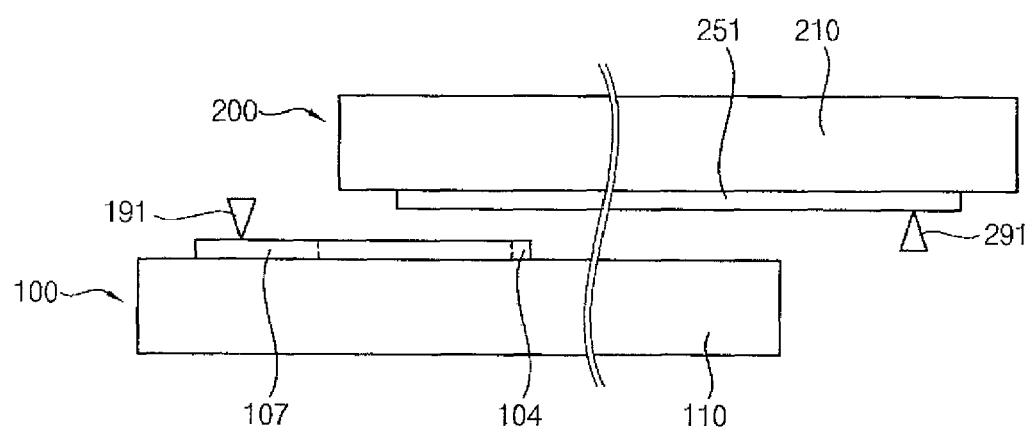
FIG. 10 is a cross-sectional view of the mother panel taken along a line III-III' in FIG. 9.

FIG. 9 is a plan view illustrating a mother panel in accordance with a second example embodiment of the present invention, on which a plurality of panel regions are defined, for manufacturing the display panel illustrated in FIG. 1. FIG. 10 is a cross-sectional view of the mother panel taken along a line III-III' in FIG. 9.

The mother panel 301 described with reference to FIGS. 9 and 10 may be substantially the same as the mother panel 101 described with reference to FIGS. 6, 7 and 8 except that the signal input pad 105 is in contact with a contact pad 108 or the static charge dissipating line 104, and a prove 291 makes contact with the common electrode 251 instead of making contact with the shorting pad to apply the common voltage to the common electrode. Therefore, the same reference numbers are used for the same or similar elements, and any further descriptions concerning the same or similar elements are omitted.

Referring to FIGS. 9 and 10, a lower substrate 100 includes a lower base substrate 110, a plurality of signal lines 111 and 113, a pixel electrode (not illustrate), and a static charge dissipating line 104.

The signal lines 111 and 113 are formed in the panel region 103. The signal lines 111 and 113 extend to a peripheral region 102 adjacent to the panel region 103. The lower substrate 100 may further include a signal input pad 105 formed in the peripheral region 102. The signal input pad 105 is electrically connected to the signal lines 111 and 113.

The static charge dissipating line 104 surrounds the panel region 103 and a portion of the peripheral region 102. A plurality of static charge dissipating lines 104 may be electrically connected to each other. Since static electricity generated in the mother panel 301 may be transmitted through the static charge dissipating line 104, the mother panel 101 may be protected from the static electricity.

In order to apply a pixel voltage to the pixel electrode, electric power is applied to the static charge dissipating line 104. The lower substrate 100 may further include a power supply pad 107. The power supply pad 107 may be formed by extending from the static charge dissipating line 104, or may be formed to be electrically connected to the static charge dissipating line 104.

The static charge dissipating line 104 is electrically connected to the signal lines 111 and 113. For example, the static charge dissipating line 104 may make contact with the signal input pad 105 that are electrically connected to the signal lines 111 and 113. The lower substrate 100 may further include a contact pad 108 for electrically connecting the signal input pad 105 to the static charge dissipating line 104. The contact pad 108 may extend from the static charge dissipating line 104. Alternatively, the contact pad 108 may be a different unit from the static charge dissipating line 104, and may makes contact with both the signal input pad 105 and the static charge dissipating line 104 to electrically connect the signal input pad 105 to the static charge dissipating line 104. Accordingly, the electric power applied to the static charge dissipating line 104 is applied to the pixel electrode as the pixel voltage through the signal lines 111 and 113.

The upper substrate 200 includes the common electrode 251 facing the pixel electrode.

According to the embodiment described in FIGS. 9 and 10, the lower substrate 100 and the upper substrate 200 are disposed so that a portion of an edge 190 of the lower substrate 100 and a portion of an edge 290 of the upper substrate 200 are exposed, in order to apply the pixel voltage to the lower substrate 100 and apply the common voltage to the upper substrate 200. Accordingly, a portion of the power supply pad 107 may be exposed at the edge 190 of the lower substrate 100, and a portion of the common electrode 251 may be exposed at the edge 290 of the upper substrate 200. In order to dispose the lower substrate 100 and the upper substrate 200 as mentioned above, at least one align-key 350 may be formed on the lower substrate 100 and the upper substrate 200.

The electric power is applied to the static charge dissipating line 104 by contacting a first prove 191 (i.e., a lower substrate power supply probe) to the static charge dissipating line 104 or the power supply pad 107 electrically connected to the static charge dissipating line 104. As described above, the electric power applied to the static charge dissipating line 104 may be applied to the pixel electrode as the pixel voltage through the signal lines 111 and 113.

The common voltage is applied to the common electrode 251 by contacting a second prove 291 (i.e., a upper substrate power supply probe) to the common electrode 251 exposed at the edge 290 of the upper substrate 200. Accordingly, an electric field may be generated in the liquid crystal layer between the pixel electrode and the common electrode 251.

Figure 11A:
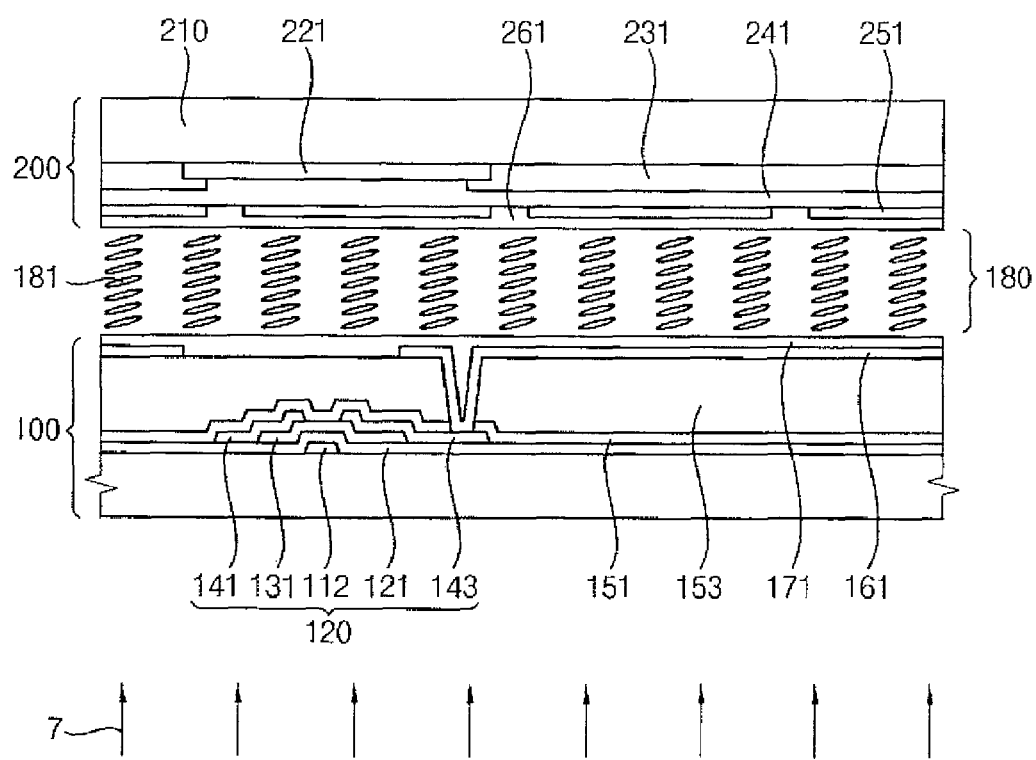
FIGS. 11A and 11B are cross-sectional views illustrating display panels in order to describe an exposure process of exposing a liquid crystal layer in accordance with an embodiment of the present invention.
Figure 11B:
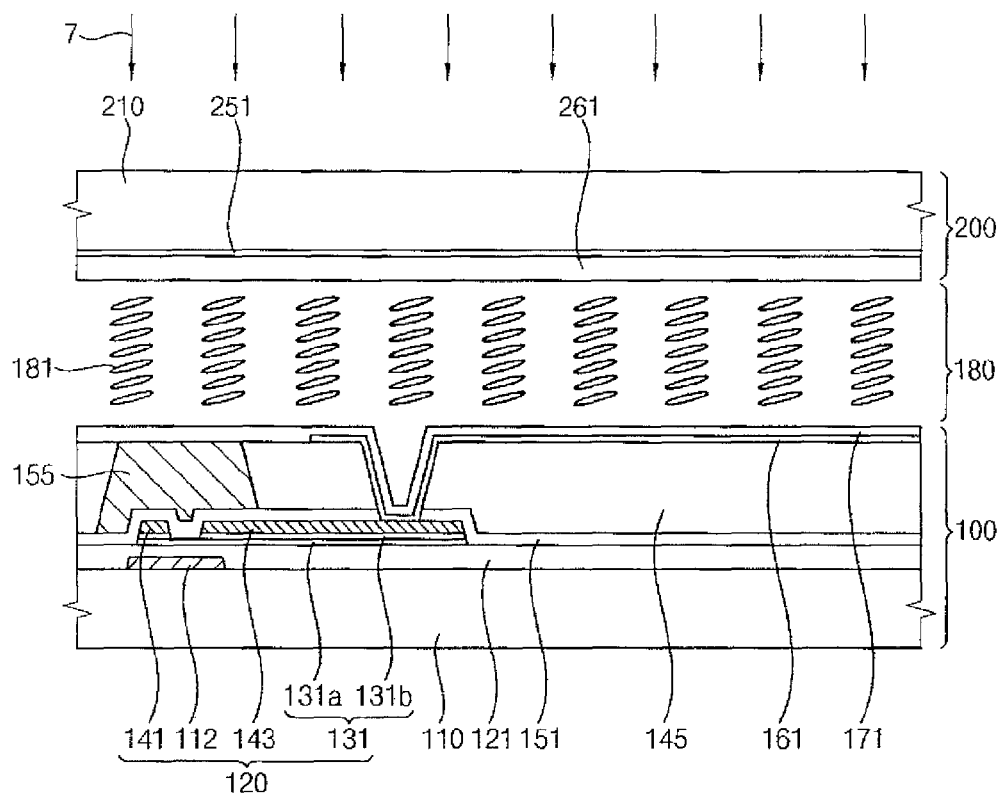
Figure 12:
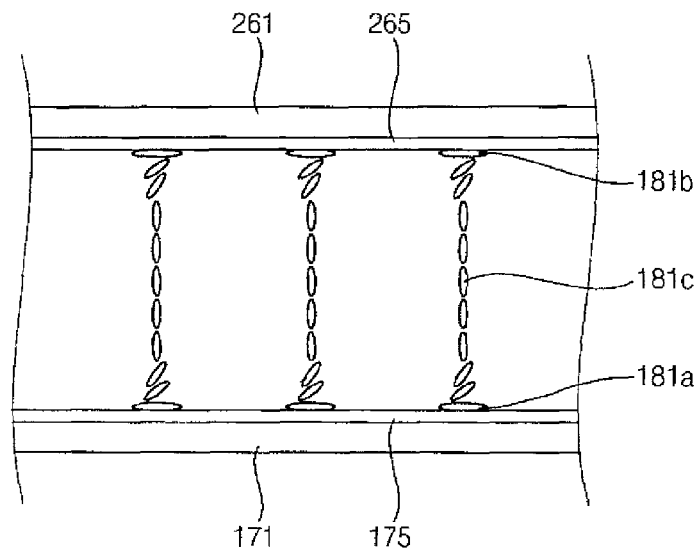
FIG. 12 is a cross-sectional view illustrating cured reactive mesogen (RM) layers formed on a first alignment layer and a second alignment layer on the display panel illustrated in FIG. 11A or FIG. 11B.

FIGS. 11A and 11B are cross-sectional views illustrating display panels in order to describe an exposure process exposing a liquid crystal layer in accordance with an embodiment of the present invention. FIG. 12 is a cross-sectional view illustrating cured RM layers formed on a first alignment layer and a second alignment layer on the display panel illustrated in FIG. 9.

FIG. 11A illustrates that light is irradiated to the display panel described in FIG. 5A, and FIG. 11B illustrates that light is irradiated to the display panel described in FIG. 5B. The light may be ultraviolet rays.

Referring to FIGS. 11A, 11B and 12, according to a method of manufacturing a display panel in accordance with an embodiment of the present invention, light is irradiated to the liquid crystal layer 180 to form a first cured RM layer 175 and a second cured RM layer 265 on the first alignment layer 171 and the second alignment layer 261, respectively (step S30 in FIG. 1).

When the pixel voltage is applied to the pixel electrode 161 and the common voltage is applied to the common electrode 251, the directional indicator of the liquid crystal molecules is tilted in a horizontal direction. As a result, the liquid crystal molecules are aligned to be in a white operation state. In order to sufficiently tilt the liquid crystal molecules, the pixel voltage and the common voltage may be sufficiently large.

In the white operation state, ultraviolet rays 7 are irradiated to the liquid crystal layer 180. In the display panel described in FIG. 5A, the color filter 231 formed on the upper substrate 200 may absorb most of the ultraviolet rays, and thus the ultraviolet rays 7 is irradiated to the lower substrate 100. In contrary, in the display panel described in FIG. 5B, the color filter 145 formed on the lower substrate 100 may absorb most of the ultraviolet rays, and thus the ultraviolet rays 7 is irradiated to the upper substrate 200.

The RM 183 (illustrated in FIG. 5A or FIG. 5B) included in the liquid crystal layer 180 reacts to the ultraviolet rays 7, and thus is cured on surfaces of the first alignment layer 171 and the second alignment layer 261 to form the a first cured RM layer 175 and a second cured RM layer 265.

Liquid crystal molecules 181a and 181b adjacent to the first alignment layer 171 and the second alignment layer 261 are fixed to the cured RM layers 175 and 265 as the liquid crystal molecules 181a and 181b are tilted in the horizontal direction. When the electric field applied to the liquid crystal layer 180 is removed, the crystal molecules are arranged as illustrated in FIG. 12. That is, the liquid crystal molecules 181a and 181b adjacent to the first alignment layer 171 and the second alignment layer 261 are tilted in the horizontal direction, and the liquid crystal molecules adjacent to the center of the liquid crystal layer 180 have a tendency to gradually be oriented in a vertical direction, like a liquid crystal molecule 181c.

According to the above-described embodiments for arranging the liquid crystal molecules, a response time of the liquid crystal molecules in response to a signal for driving a panel (i.e., the response time of the liquid crystal molecules) may be considerably improved. Further, arranging directions of the liquid crystal molecules are varied, so that a viewing angle may be increased.

The mother panel is cut along the panel region 103 to manufacture a plurality of display panels.

Figure 13:
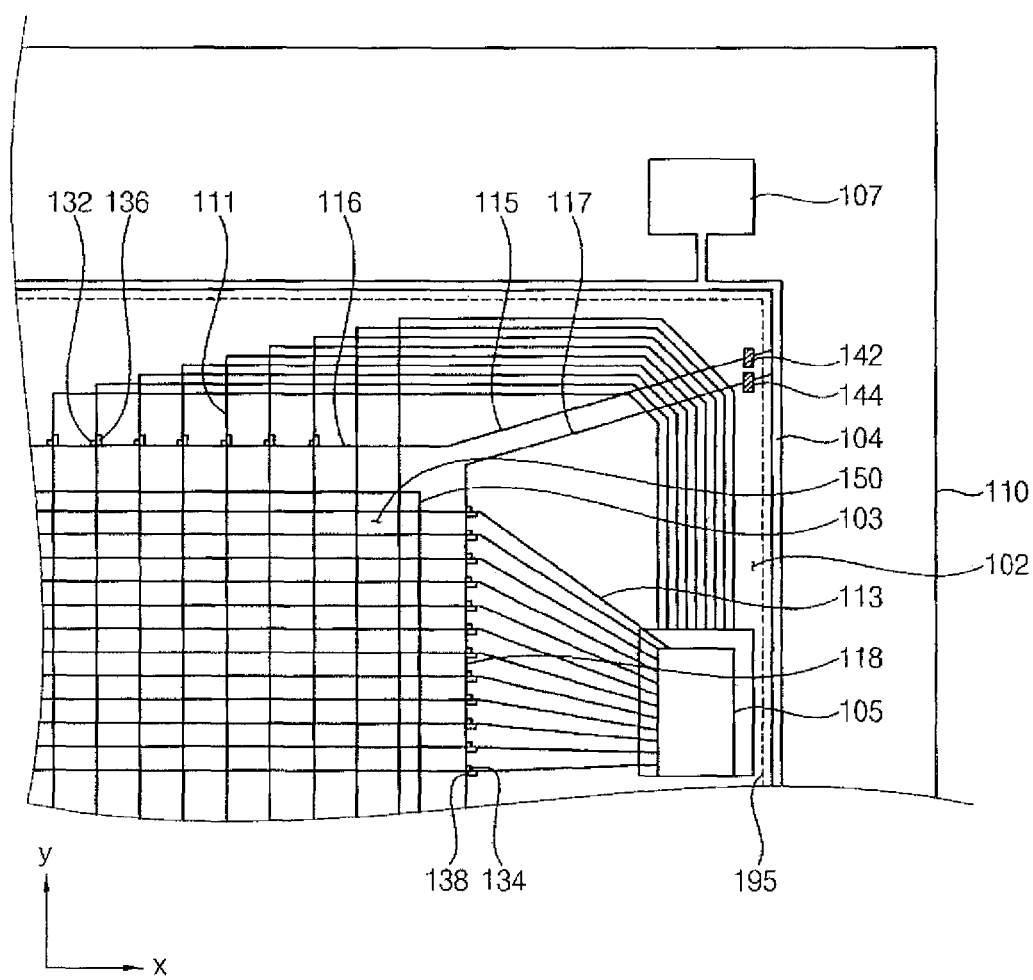
FIG. 13 is an enlarged plan view illustrating a portion of a lower substrate of a mother panel in accordance with an embodiment of the present invention.

FIG. 13 is an enlarged plan view illustrating a portion of a lower substrate of a mother panel in accordance with a third example embodiment of the present invention. FIG. 13 is for explaining a method of applying electric power to the lower substrate to repair a display panel having a fault caused by a defective exposure process.

The lower substrate 400 described with reference to FIG. 13 may be substantially the same as the lower substrate 100 described with reference to FIG. 3 except for power input terminals 142 and 144. Therefore, the same reference numbers are used for the same or similar elements, and any further descriptions concerning the same or similar elements are omitted.

The mother panel 101 including a plurality of panel regions 103 and a plurality of static charge dissipating lines 104 surrounding the corresponding panel regions 103 described in FIGS. 2 to 6 is cut along a cutting line 195 to manufacture a plurality of display panels. Unexpectedly, a few display panels cut from the mother panel may have a fault caused by a defective exposure process. In order to repair the faulty display panel, it is necessary to further irradiate light to the faulty display panel while electric power (or a pixel voltage) is applied to the lower substrate and a common voltage is applied to the common electrode.

However, since the cut display panel does not include the static charge dissipating line 104, an additional member for applying the electric power to the lower substrate is necessary.

The lower substrate 400 described in FIG. 4 further includes power input terminals 142 and 144 for applying the electric power to the shorting lines 116 and 118. The terminals 142 and 144 are electrically connected to the power transmission lines 115 and 117.

When the light is further irradiated to the faulty display panel to repair the faulty display panel, the electric power is applied to the power input terminals 142 and 144 to an the lower substrate 400 through the power input terminals 142 and 144. The electric power is applied to the power input terminals 142 and 144 to apply the pixel voltage to the pixel electrode. The electric power applied to the power input terminals 142 and 144 is transmitted to the pixel electrode through the power transmission lines 115 and 117, the shorting lines 116 and 118 and the signal lines 111 and 113.

The embodiment described in FIG. 13 relates to the lower substrate of the mother panel. Therefore, a method of applying the common voltage to the common electrode (not illustrated) of the upper substrate will be omitted.

While the electric power is applied to the pixel electrode through the power input terminals 142 and 144, and the common voltage is applied to the common electrode, the cured RM layers 175 and 265 are reformed by the exposure process described with reference to FIG. 11A or FIG. 11B. Accordingly, the faulty display panel caused by a defective exposure process may be simply repaired.

According to the example embodiments of the present invention, additional signal input lines separately corresponding to the plurality of signal lines, which are necessary for an exposure process of exposing a conventional mother panel, are not necessary in the mother panel in accordance with the embodiments of the present invention. Instead, electric power is applied to the static charge dissipating line 104 formed on the mother panel, so that a substantially uniform pixel voltage may be simply applied to all of the pixel electrodes of the panel region 103.

More specifically, the static charge dissipating line 104 is electrically connected to the gate shorting line 116 and the data shorting line 118 through the first connection line 115 and the second connection line 117, or the static charge dissipating line 104 makes contact with the signal input pad 105 electrically connected to the signal lines 111 and 113, and the electric power is applied to the static charge dissipating line 104, so that a substantially uniform pixel voltage may be simply applied to all of the pixel electrodes 161 of the panel region 103.

In order to apply a common voltage to the common electrode 251, the common voltage may be applied to the shorting pad 109 that is formed in the lower substrate and electrically connected to the common electrode 251. Alternatively, the common voltage is directly applied to the common electrode by an upper substrate power supply probe 291.

According to the present invention, a pixel voltage may be uniformly applied to all of the pixel electrodes, so that arrangements of liquid crystal molecules arranged by the cured RM layer may be substantially uniform in each pixel region. Further, the manner of applying the voltage may be facilitated, and thus effective in a structure having a small separation interval between adjacent pixels. Moreover, a processing rate may be increased.

The foregoing is illustrative of the present disclosure and is not to be construed as limiting thereof. Although a few example embodiments of the present invention have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A mother panel for manufacturing a display panel, comprising:
   an upper substrate;
   a lower substrate including:
      a plurality of signal lines formed in a panel region defined on the lower substrate;

a pixel electrode connected to the signal lines in the panel region; and a static charge dissipating line formed in a peripheral region adjacent to the panel region, the static charge dissipating line receiving electric power and applying the electric power to the pixel electrode as a pixel voltage through the signal lines; and a liquid crystal layer interposed between the upper substrate and the lower substrate.

2. The mother panel of claim 1, wherein the lower substrate further includes a power supply pad extending from the static charge dissipating line, wherein the electric power is applied to the power supply pad, and the electric power applied to the power supply pad is transmitted to the static charge dissipating line.

3. The mother panel of claim 1, wherein the lower substrate further includes a shorting line formed in the peripheral region to electrically connect the signal lines, and a power transmission line connecting the static charge dissipating line to the shorting line.

4. The mother panel of claim 3, wherein the lower substrate further includes a power supply pad extending from the static charge dissipating line and being formed in the peripheral region, electric power being applied to the power supply pad, wherein the electric power applied to the power supply pad is transmitted to the pixel electrode through the static charge dissipating line, the power transmission line, the shorting line and the signal lines.

5. The mother panel of claim 3, wherein the lower substrate further includes a plurality of shorting diodes connected to the shorting line and the signal lines, and the shorting diode outputs the electric power to a signal line when the electric power applied to the shorting line turns on the shorting diode.

6. The mother panel of claim 5, wherein the lower substrate further includes a plurality of protection diodes connected to the shorting line and the signal lines, and the protection diode outputs the signal to the shorting line, when a signal transmitted through the signal line turns on the protection diode.

7. The mother panel of claim 6, wherein the signal line includes a gate line connected to a gate electrode of a thin-film transistor (TFT) and a data line connected to a source electrode of the TFT, and the shorting line includes:
a gate shorting line connected to the power transmission line, the gate shorting line electrically shorting a plurality of gate lines; and
a data shorting line connected to the power transmission line, the data shorting line electrically shorting a plurality of data lines.

8. The mother panel of claim 3, wherein the static charge dissipating line surrounds the panel region and a portion of the peripheral region, wherein the lower substrate further includes a power input terminal formed in the region surrounded by the static charge dissipating line, the power input terminal being electrically connected to the power transmission line and the shorting line.

9. The mother panel of claim 1, wherein the lower substrate further includes a signal input pad formed in the peripheral region, the signal input pad being electrically connected to the signal lines.

10. The mother panel of claim 9, wherein the signal input pad is in contact with the static charge dissipating line, and the electric power applied to the static charge dissipating line is applied to the signal lines through the signal input pad in contact with the static charge dissipating line.

11. The mother panel of claim 9, wherein the lower substrate further includes a contact pad being in contact with both the signal input pad and the static charge dissipating line to electrically connect the signal input pad to the static charge dissipating line.

12. The mother panel of claim 1, wherein the lower substrate includes a plurality of panel regions and a plurality of static charge dissipating lines surrounding corresponding panel regions, and the plurality of the static charge dissipating lines is electrically connected to each other.

13. The mother panel of claim 1, wherein the upper substrate includes a common electrode, and the lower substrate further includes a shorting pad formed in the peripheral region, the shorting pad being electrically connected to the common electrode to receive a common voltage.

14. The mother panel of claim 1, wherein the upper substrate includes a common electrode, and a common voltage is directly applied to the common electrode by an upper substrate power supply probe.

15. The mother panel of claim 1, wherein the lower substrate further includes a first alignment layer formed on the pixel electrode, and a first cured reactive mesogen (RM) layer disposed on the first alignment layer, wherein the upper substrate further includes a common electrode, a second alignment layer formed on the common electrode, and a second cured RM layer disposed on the second alignment layer.

16. The mother panel of claim 15, wherein the first and second cured RM layers are formed by irradiating light to the liquid crystal layer, which includes a plurality of liquid crystal molecules and an RM mixed with the liquid crystal molecules, to cure the RM, while the pixel voltage is applied to the pixel electrode and a common voltage is applied to the common electrode.

17. A method of manufacturing a display panel, comprising:
applying a pixel voltage to a pixel electrode through a plurality of signal lines by applying electric power to a static charge dissipating line formed in a peripheral region of a lower substrate, the plurality of signal lines being electrically connected to the static charge dissipating line;
applying a common voltage to a common electrode formed on an upper substrate; and
irradiating light to a liquid crystal layer which includes a plurality of liquid crystal molecules and an RM mixed with the liquid crystal molecules, to form a first cured RM layer and a second cured RM layer on the pixel electrode and the common electrode, respectively.

18. The method of claim 17, further comprising:
forming a first alignment layer on the pixel electrode; and
forming a second alignment layer on the common electrode,
wherein the first cured RM layer and the second cured RM layer are formed on the first alignment layer and the second alignment layer, respectively.

19. The method of claim 17, wherein the electric power applied to the static charge dissipating line is transmitted to a shorting line electrically connected to the static charge dissipating line, the plurality of signal lines is electrically shorted by the shorting line.

20. The method of claim 19, wherein the pixel voltage is applied to the pixel electrode by using a shorting diode, and
the shorting diode outputs the electric power to a signal line when the electric power transmitted to the shorting line turns on the shorting diode.

21. The method of claim 20, wherein a protection diode is connected to the signal line and the shorting line, and
the protection diode outputs the signal to the shorting line, when a signal transmitted through the signal line turns on the protection diode.

22. The method of claim 19, further comprising:
providing a mother panel including a plurality of panel regions and a plurality of static charge dissipating lines surrounding corresponding panel regions; and
cutting the mother panel to form a plurality of display panels, each of the display panels including respective panel regions and respective peripheral regions but not including the static charge dissipating line.

23. The method of claim 22, farther comprising:
applying electric power to a power input terminal formed in the peripheral region of the lower substrate, the power input terminal being electrically connected to the shorting line;
applying a common voltage to the common electrode; and
irradiating light to the liquid crystal layer, to reform the first cured RM layer and the second cured RM layer anew on the pixel electrode and the common electrode, respectively.

24. The method of claim 22, wherein the plurality of the static charge dissipating lines is electrically connected to each other to simultaneously receive the electric power.

25. The method of claim 17, wherein applying the pixel voltage to the pixel electrode includes:
applying the electric power to a gate electrode of a TFT through a gate shorting line connected to the static charge dissipating line and a gate line connected to the gate shorting line; and
applying the electric power to a source electrode of the TFT through a data shorting line connected to the static charge dissipating line and a data line connected to the data shorting line.

26. The method of claim 17, wherein the common voltage is applied through a shorting pad formed in the peripheral region of the lower substrate, the shorting pad being electrically connected to the common electrode.

27. The method of claim 26, further comprising:
removing a portion of an edge of the upper substrate to expose the shorting pad and a power supply pad extending from the static charge dissipating line; and
contacting a probe to the shorting pad and to the power supply pad to apply the pixel voltage to the lower substrate and the common voltage to the shorting pad, respectively.

28. The method of claim 17, further comprising:
disposing the lower substrate and the upper substrate so that a portion of an edge of the lower substrate and a portion of an edge of the upper substrate are exposed;
contacting a first probe to a power supply pad formed at the exposed portion of the edge of the lower substrate to apply the electric power to the static charge dissipating line; and
contacting a second probe to the common electrode at the exposed portion of the edge of the upper substrate to apply the common voltage to the common electrode.

29. The method of claim 17, wherein the electric power applied to the static charge dissipating line is transmitted to a signal input pad that is electrically connected to the signal lines and the static charge dissipating line, and the electric power applied to the signal input pad is transmitted to the signal lines.

30. The method of claim 29, wherein the electric power applied to the static charge dissipating line is transmitted to the signal input pad through a signal input pad that is in contact with the signal input pad.

* * * * *